US010133987B2

(12) United States Patent
Mitola, III

(10) Patent No.: US 10,133,987 B2
(45) Date of Patent: Nov. 20, 2018

(54) CATEGORIZING RADIO SIGNALS WHILE OBFUSCATING CHARACTERISTICS OF FEDERAL RADIO SIGNALS

(71) Applicant: Federated Wireless, Inc., Boston, MA (US)

(72) Inventor: Joseph Mitola, III, Cocoa Beach, FL (US)

(73) Assignee: FEDERATED WIRELESS, INC., Arlington, VA (US)

( * ) Notice: Subject to any disclaimer, the term of this patent is extended or adjusted under 35 U.S.C. 154(b) by 928 days.

(21) Appl. No.: 14/330,202

(22) Filed: Jul. 14, 2014

(65) Prior Publication Data
US 2017/0147940 A1 May 25, 2017

(51) Int. Cl.
*G06N 7/00* (2006.01)
*G06N 3/02* (2006.01)
*G06N 99/00* (2010.01)
*H04B 17/345* (2015.01)
*H04L 1/24* (2006.01)

(52) U.S. Cl.
CPC ............ *G06N 99/005* (2013.01); *G06N 3/02* (2013.01); *G06N 7/005* (2013.01); *H04B 17/345* (2015.01); *H04L 1/245* (2013.01)

(58) Field of Classification Search
CPC ................................ G06N 7/005; G06N 3/02
USPC ........................................................... 706/20
See application file for complete search history.

(56) References Cited

PUBLICATIONS

Barathram Ramkumar ("automatic modulation classification for cognitive radios using cyclic feature detection" 2009).*

* cited by examiner

*Primary Examiner* — Lut Wong
(74) *Attorney, Agent, or Firm* — Finnegan, Henderson, Farabow, Garrett & Dunner, LLP

(57) ABSTRACT

Systems and methods are provided for categorizing signals sensed from receivers into one of a plurality of categories using a machine learning component that obfuscates other characteristics of the signals beyond the categorization of the signal. A set of training signals is generated that includes signals representative of each of a plurality of categories of signals. A machine learning component is trained using the set of training signals so that the machine learning technique can categorize new signals into one of the plurality of categories. The machine learning component is transmitted to one or more receivers so that each receiver can categorize sensed signals into one of the plurality of categories using the machine learning component while obfuscating other characteristics of the sensed signals.

20 Claims, 8 Drawing Sheets

| | GSM | UTRA FDD | LTE |
|---|---|---|---|
| channel spacing 3202 | 200 kHz | 5 MHz | 10 MHz |
| access mode 3204 | FDMA/TDMA | Direct Sequence (DS) CDMA | OFDM |
| duplex mode 3206 | FDD/TDD | FDD | TDD FDD |
| users per carrier frequency 3208 | 8 | depends on the situation | Multiple |
| net data rate 3210 | 13 kbit/s | 8 kbit/s to 2 Mbit/s | 2-50 Mbps |
| modulation mode 3212 | GMSK | QPSK | N-QAM |
| channel coding 3214 | CRC, convolutional | convolutional, turbo, CRC with interleaving | Multiple |
| symbol duration 3216 | 3.692 µs | depends on the spreading factor | 83 or 74 usec |
| bits per burst (slot) 3218 | 156.25 | depends on the spreading factor | 6 or 7 *N |
| burst (slot) duration 3220 | 0.577 ms | 0.677 ms | 0.5 ms |
| frame duration 3222 | 4.62 ms | 10 ms | 10 ms |
| channel bit rate 3224 | 270.833 kbit/s | depends on the situation | Multiple |
| maximum cell radius 3226 | 35 km | few kilometers | 0.7-80 km |
| user specific signatures 3228 | - | OVFS codes | - |
| spreading factor 3230 | 1 | $2^k$; k=2, 3, ... 8; 512 downlink only | - |
| chip rate 3232 | - | 3.84 Mchip/s | - |

FIG. 3B

ANN Node 450

CATEGORIZING RADIO SIGNALS WHILE OBFUSCATING CHARACTERISTICS OF FEDERAL RADIO SIGNALS

TECHNICAL FIELD

Disclosed systems, methods and media generally relate to categorizing radio signals while obfuscating characteristics of federal radio signals, and in particular to obfuscating radio signals of federal incumbent systems.

BACKGROUND

Contemporary software and cognitive radio technologies have allowed regulators to transition from a scheme of allocation of radio frequencies by band having a specified usage such as commercial cellular, military radar, navigation aids, and satellite communications to one of shared spectrum. IEEE 802.11, WiFi, for example, shares the 5.9 GHz band with radar systems. A WiFi device detects the presence of the radar and then ceases to use that band for 30 minutes. The signal processing of a radio signal may determine that such a signal represents noise, a signal authorized to share such a band, or an incumbent signal to which a secondary user such as WiFi must defer by evacuating the band, or may in advanced spectrum sharing systems tolerate a given level of interference from such an incumbent. Contemporary technology typically classifies an incumbent signal into a specific type of incumbent signal such as a particular military radar, navigation signal (e.g. GPS), or a communications type of signal such as a fixed satellite station (FSS); this process is termed signal classification. Historically the collection of characteristics of military signals for the purpose of discovering their capabilities, limitations, and vulnerabilities has been called signals intelligence (SIGINT). For example, see the discussion of signals intelligence in *Joint Publication 1-02, Department of Defense Dictionary of Military and Associated Terms* (Washington, D.C.: The Pentagon) 31 Oct. 2009.

SIGINT has been dealt with via strict partitioning of the spectrum into bands with legal prohibitions on collecting signal information in the military bands. For example, Public Law Title 18 provides US espionage statues that prohibit the conduct of SIGINT by any private person or unauthorized party (e.g. an agent of a foreign government). Other countries with significant potential for adopting spectrum sharing technologies also have comparable legal prohibitions. Therefore the introduction of spectrum sharing would appear to require a commercial spectrum access system (SAS) to perform SIGINT in order to detect federal incumbent signals via a process of signal-type classification in order to infer that the specific interference encountered constitutes a specific federal or commercial (e.g. FSS) incumbent signal type.

In-band signal classification can be used by a given radio system having secondary use, e.g. of the 5.9 GHz radar band for wireless local area networking (WLAN), to determine whether interference (when present) is caused by an incumbent and can defer to the incumbent on its own. However, there are typically security risks to such an arrangement. For example, the classification of federal incumbent in-band interference with respect to specific signal type, such as a specific Naval radar system, may reveal its capabilities and limitations over time to an unauthorized party. For example, advanced persistent threat malware may access a SAS, thus realizing a de facto type of SIGINT for the operator of the malicious agent, such as an agent of a foreign government not amicable to the US (or other host nation). An additional disadvantage of in-band interference detection and classification is that a spectrum sharing radio device or a collection of many such devices must operate on the given frequency at the time of the interference in order to detect the interference, generating unintentional interference to the incumbent that could constitute jamming and that thus also could be subject to criminal sanctions.

Spectrum sharing occurs today. Some bands of licensed spectrum, such as the AWS spectrum band (1710 MHz), is licensed subject to exclusion zones where licensees cannot use the shared spectrum. For example, common carriers (e.g., Verizon, AT&T, etc.) are not allowed to use AWS spectrum within 80 miles of Cherry Point, N.C. because the FCC so stipulated in granting the relevant licenses. Currently, taking measurements to assure adherence to exclusion zones for spatial spectrum sharing is usually a tedious process. For example, network operators and major service providers (e.g., Verizon) take measurements by ordering a crew to drive an instrumentation van to the site in question in order to take measurements and to analyze the measurements (e.g., for network planning and management). Network operators and major service providers are often expected to protect such information regarding incumbent signals (e.g., acquired at Cherry Point) to avoid the potential for inadvertent SIGINT and unauthorized disclosure, which is potentially subject to legal sanctions. The industry refers to the cost of making such measurements, analyzing the signals, and protecting the results as drive time.

Contemporary wireless communication standards (e.g., LTE) empower handsets to report measurements to cellular infrastructure (e.g., such as eNode B (eNB) of a Verizon LTE wireless system). This allows such measurements to be used for network operations and planning functions without needing to drive a truck to measure signals in the area of interest. For example, the LTE term for this approach is termed minimizing drive testing (MDT) or as minimizing drive time (MDT). While beneficial, as spectrum sharing devices (e.g., such as small cells) proliferate, MDT from such cells may be employed by unauthorized third parties having malicious intent. For example, a third party can employing malware in contemplated SAS systems to exploit MDT without the service provider's knowledge or intent to perform SIGINT operations against a federal incumbent such as the US Navy. Similarly, for example, a future General Authorized Access (GAA) radio access point (RAP) may receive what appears to be noise in a vacant channel. A malicious agent may aggregate such measurements and could use the results of signal type classification in an attempt perform SIGINT against a federal incumbent.

Furthermore, it is often very tedious, and may not be legal, for a federal incumbent organization to provide all of the details of operation of a federal incumbent signal such as a military radar to a commercial SAS or service provider for signal type classification to use in order to avoid offering harmful interference to incumbent radar signals.

SUMMARY

The techniques described herein provide for signal categorization (SigCat) that can be used to categorize signals, such as federal signals including military radar and communications signals, without indicating the specific type of federal radio frequency (RF) system or device (e.g., to an unauthorized third party). In some embodiments, techniques of machine learning, such as via an Artificial Neural Network (ANN or more briefly, NN), may be employed as described herein in a SigCat apparatus in lieu of signal type classification. Such an NN may be trained, e.g. by the federal government or by an authorized SAS, in a protected national security workspace, to categorize such signals. For example, signals can be categorized into broad categories, such as (a) incumbent, (b) managed signal, (c), noise, (d) mixture of managed and incumbent signals and (e) unknown. Such machine learning may train the system (e.g., a NN algorithm or device realizing NN logic) to detect and to categorize a wide variety of different types of incumbent signals. For example, training may introduce a variety of replicas of signals, such as a US Navy radar, US Air Force tactical networking signals, etc. as part of the training set so that the machine learning component can categorize signals from US Navy radar, US Air Force tactical networking signals, etc. into a general class of "incumbent" vs. revealing the specific signal type via contemporary signal type classification.

In addition, the SigCat system can learn characteristics of noise, managed signals used by shared spectrum devices, and/or federal incumbent signal structures over time, e.g. via what may be termed in the art a hidden Markov model (HMM). Various types of interference may generate different types of signal artifacts (e.g., having different signal shapes and associated HMMs). In this context, interference refers to the presence of excessive levels of RF energy entering a receiver; an incumbent, for example, may be trying to use a given band also being used by a different, lower-priority device so that interference between the signals creates signal artifacts in the incumbent RF system. The SigCat system can learn such signal artifacts so that a given wireless network operating in a given locale may employ the techniques described herein (e.g., a SigCat NN) to learn signal details in order to categorize federal signals without indicating the specific type of federal signal to an unauthorized third party. For example, a HMM can integrate a diversity of signal artifacts occurring in one or more bands in the machine learning component. A signal artifact may include, for example, a harmonic of an incumbent signal; such a harmonic of, for example, a high power radar, may occur in an adjacent channel with sufficient signal strength to present interference to a secondary user such as a shared spectrum device.

The bands learned by a SigCat NN employing a HMM can include a managed band, a band that is distant in center frequency from a band of operation, a band that is distant in center frequency from a band of interest for future usage, or any combination thereof.

The National Institutes of Standards and Technology (NIST) term as an advanced persistent threat (APT) malware that may have entered a computing environment such as a SAS for a malicious purpose such as to perform SIGINT by the unauthorized exfiltration of incumbent signal information, circumventing host nation national security.

In order to protect the privacy of federal incumbents with respect to military signal structures, a Federal SAS (FSAS) may incorporate a federal spectrum observatory (FSO) that may acquire federal incumbent signals legally to generate information by which an FSO may train a SigCat NN. Once trained, a FSAS may provide copies of the resulting SigCat NN to a commercial SAS, such as a regional SAS (RSAS), for use in a relatively open commercial setting.

For example, a radar signal is an illustrative type of interference caused by a federal incumbent. Other types of federal incumbent can include frequency hopping radios, direct sequence spread spectrum radios, chaos based radios, and various hybrids among these various specific methods of rendering federal incumbent signals more specifically appropriate to federal incumbent usage. A SigCat NN apparatus can be trained in accordance with the techniques described herein to categorize all such signals as federal incumbent without reveling to a third party specifically which characteristics of the signal entail a signal type, and therefore hiding the capabilities and limitations of such federal signal from an unauthorized third party.

The disclosed subject matter includes a computerized method of categorizing signals sensed from receivers into one of a plurality of categories using a machine learning component that obfuscates other characteristics of the signals beyond the categorization of the signal. A computing device generates a set of training signals comprising signals representative of each of a plurality of categories of signals. The computing device trains a machine learning component using the set of training signals so that the machine learning technique can categorize new signals into one of the plurality of categories. The computing device transmits the machine learning component to one or more receivers so that each receiver can categorize sensed signals into one of the plurality of categories using the machine learning component while obfuscating other characteristics of the sensed signals.

The disclosed subject matter includes a computing device for categorizing signals sensed from receivers into one of a plurality of categories using a machine learning component that obfuscates other characteristics of the signals beyond the categorization of the signal. The computing device includes a database and a processor in communication with the database. The processor is configured to run a module stored in memory that is configured to cause the processor to generate a set of training signals comprising signals representative of each of a plurality of categories of signals, train a machine learning component using the set of training signals so that the machine learning technique can categorize new signals into one of the plurality of categories, and transmit the machine learning component to one or more receivers so that each receiver can categorize sensed signals into one of the plurality of categories using the machine learning component while obfuscating other characteristics of the sensed signals.

The disclosed subject matter includes a non-transitory computer readable medium having executable instructions operable to cause an apparatus to generate a set of training signals comprising signals representative of each of a plurality of categories of signals. The executable instructions are operable to cause an apparatus to train a machine learning component using the set of training signals so that the machine learning technique can categorize new signals into one of the plurality of categories. The executable instructions are operable to cause an apparatus to transmit the machine learning component to one or more receivers so that each receiver can categorize sensed signals into one of the plurality of categories using the machine learning component while obfuscating other characteristics of the sensed signals.

In one or more embodiments, data is received from a receiver of the one or more receivers indicative of a device interfering with an incumbent device, and a notification is transmitted to the device to terminate transmissions to prevent the device from interfering with the incumbent device. Generating the set of training signals can include determining a set of spectrum artifacts that occur below a given noise floor but that may be integrated above the noise floor, and training the machine learning component can include training the machine learning component using the set of spectrum artifacts so that the machine learning component can detect and categorize interference between signals from a plurality of devices.

In some embodiments, interference is detected in a given band of spectrum, signal artifacts are detected in adjacent or distant bands of the spectrum, and the detected interference is correlated with the detected signal artifacts to determine whether a signal categorization is reliable. Training the machine learning component can include training a set of signal structures with respect to time and frequency occupancy to generate a hidden Markov model to integrate a diversity of signal artifacts occurring in one or more bands in the machine learning component. The one or more bands can include a managed band, a band that is distant in center frequency from a band of operation, a band that is distant in center frequency from a band of interest for future usage, or any combination thereof. Data can be received indicative of incumbent interference in a frequency band, and a degree of interference in a band of interest can be determined based on the incumbent interference.

Since the resulting SigCat NN contains only a combination of various weights and nonlinear logic, it is essentially impossible for a malicious agent to reverse-engineer the NN to determine the capabilities and limitations of federal incumbent signals used to train the NN (e.g., such as military radar or communications systems using a shared spectrum band). Given an assumption of best commercial practices in cyber security, one must anticipate both insider threats and the APT. The techniques described herein, such as training a SigCat NN, can obfuscate specific federal signals used to train the NN, while still allowing use of the NN to categorize signals, e.g. in a spectrum sharing device. This can protect, for example, federal capabilities and limitations and incumbent operations from unauthorized third parties, regardless of whether enabled by a SAS insider, by an APT, or the like.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF SUMMARY OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIG. 3B illustrates communications signals parameters of signals that can be used to train a device for obfuscating radio signals, according to some embodiments.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Figure 1:
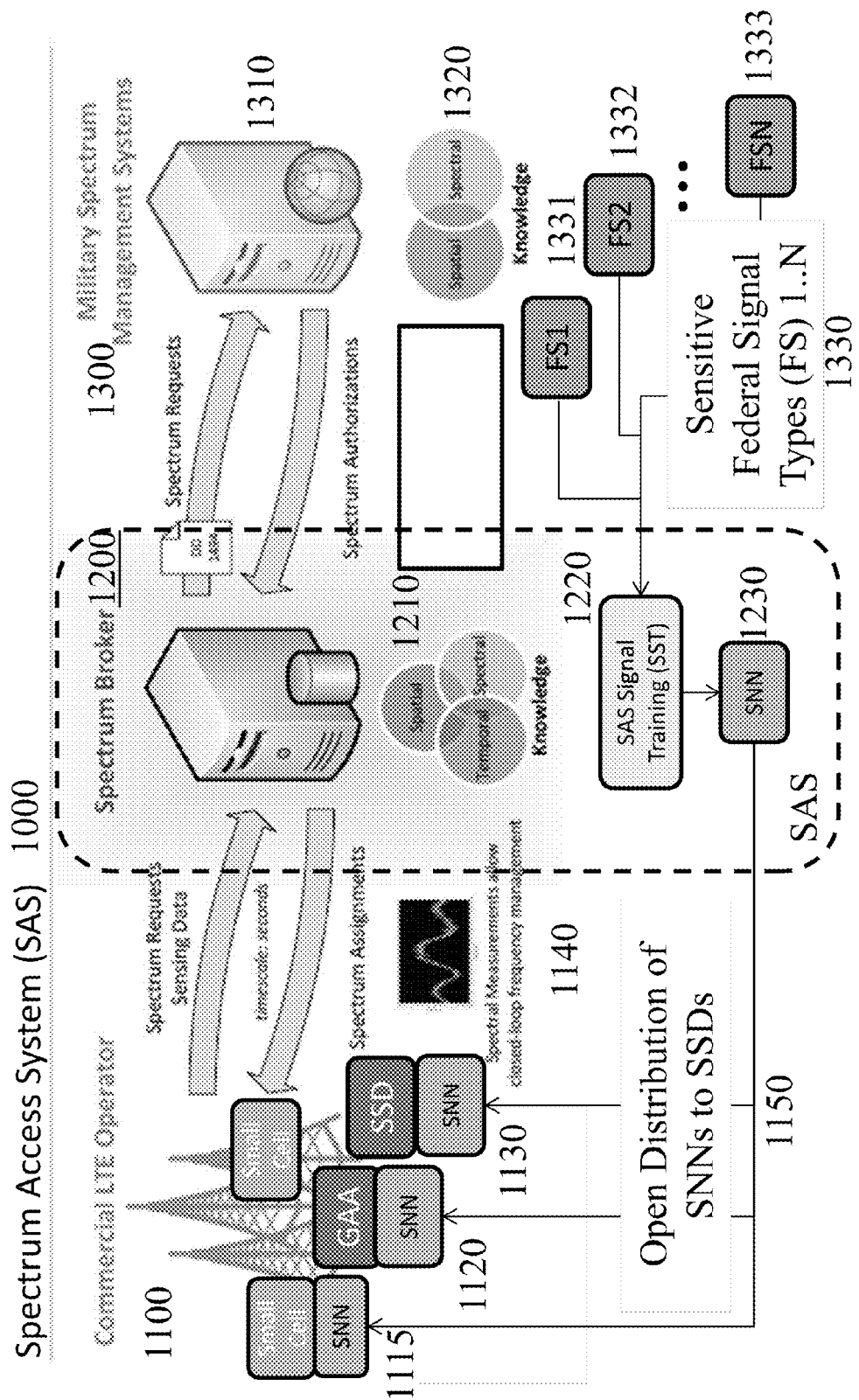
FIG. 1 illustrates a Spectrum Access System (SAS) for managing shared spectrum including obfuscating radio signals, according to some embodiments.

FIG. 1 illustrates a Spectrum Access System (SAS) 1000 for obfuscating radio signals, according to some embodiments. The SAS 1000 comprises a commercial domain 1100 (Commercial LTE Operator), a spectrum broker 1200 and a military spectrum management system 1300. A commercial domain 1100 may comprise one or more small cells 1115, e.g. that may include Priority Access License (PAL) devices; one or more shorter range WiFi like devices such as general authorized access (GAA) devices 1120; and one or more other types of spectrum sharing devices (SSD) 1130. Each type of spectrum sharing device 1115-1130 may perform spectrum measurements to allow closed-loop frequency management, indicated at 1140.

A spectrum broker 1200 as illustrated in FIG. 1 may comprise a database 1210 of spatial, temporal, and spectrum knowledge; and a SAS signal training system (SST) 1220 capable of generating SigCat NN's (SNN) 1230. The commercial LTE operator 1100 provides spectrum requests and sensing data to the spectrum broker 1200. The spectrum broker 1200 provides spectrum assignments to the commercial LTE operator 1100. The spectrum broker 1200 provides the SSN 1230 to the small cells of the commercial operator 1100.

The spectrum broker 1200 provides spectrum requests to the military spectrum management system 1300. The military spectrum management system 1300 provides spectrum authorizations to the spectrum broker 1200. A military spectrum management system 1300 may comprise a spectrum authorization system 1310; a collection of spatial and spectrum knowledge 1320, much of which may include knowledge of people associated with the design, development, and operation of military systems; and a collection 1330 of sensitive federal incumbent signal types, as illustrated federal signal type one (FS1), 1331; federal signal type two (FS2), 1332; and so forth until federal signal type N (FSN), 1333. The information associated with FS1, FS2, . . . FSN include time-domain samples of a signal and parameters of such a signal such as its carrier frequency and bandwidth. The military spectrum management system 1300 provides the collection 1330 of sensitive federal incumbent signal types including samples and parameters to the SST system 1220.

The SAS signal training system 1220 may be located in different systems, including a military spectrum management system 1300 or in a spectrum broker 1200 (as shown in FIG. 1). The SST 1220 generates SNN 1230 based on the sensitive federal signal types 1330, as described further herein.

Figure 2:
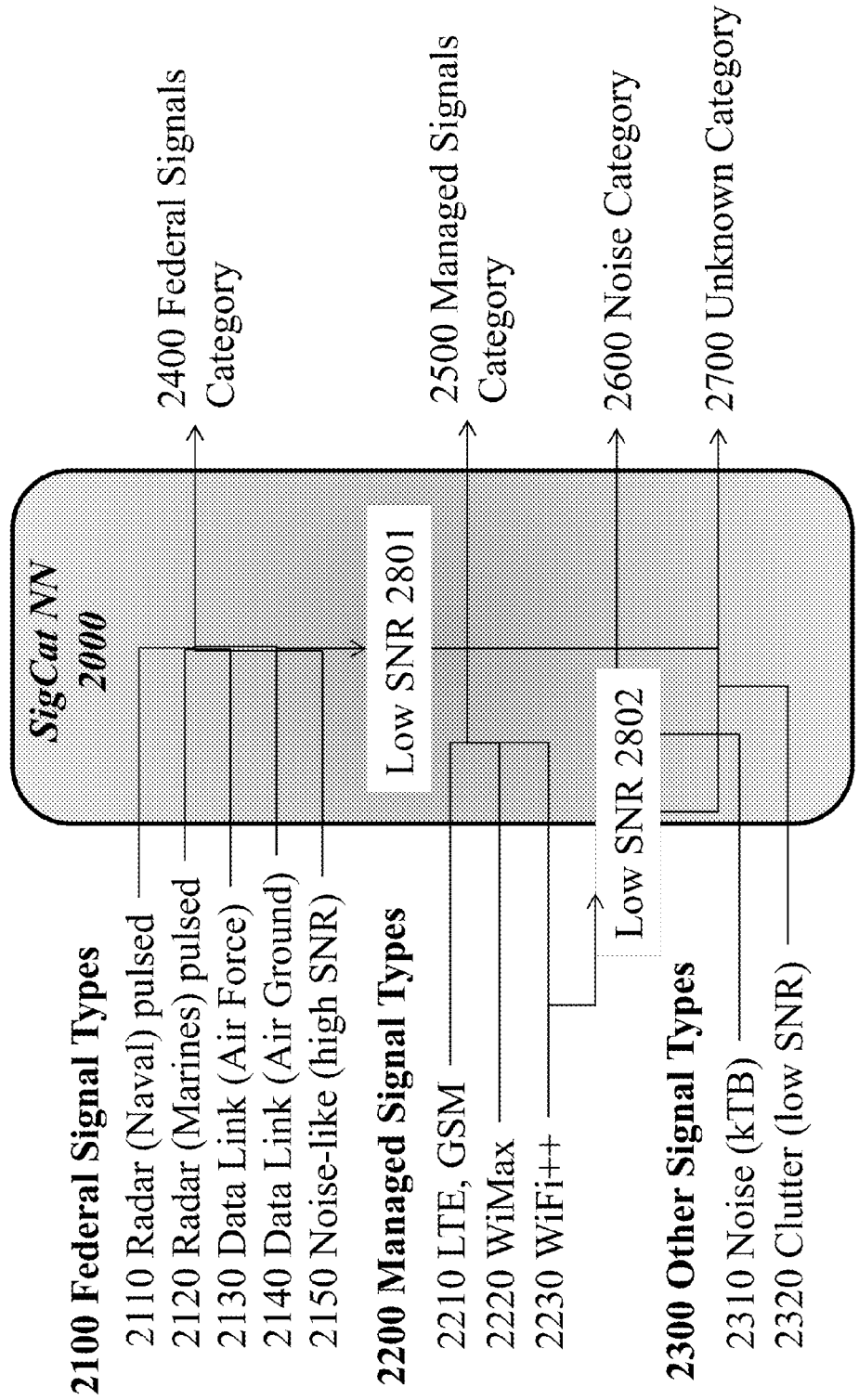
FIG. 2 illustrates a signals categories (SigCat) learning machine for obfuscating radio signals, according to some embodiments.

FIG. 2 illustrates a Signals Categories (SigCat) learning machine 2000 for obfuscating radio signals, according to some embodiments. The learning machine 2000 can be realized, for example, as a neural network, support vector machine (SVM) and/or other pattern recognition function for which the reverse engineering of which is impracticable. For illustration purposes, FIG. 2 shows a SigCat learning machine 2000, which includes a neural network having training inputs 2100-2300, producing categories 2400-2700, and employing various degrees of noise sources 2801 and 2802. As described further below, the noise sources can be used to add noise to a particular type of signal to train the system to identify noisy versions of those signals.

Federal Signal Types 2100 comprise time domain and frequency domain samples of signals organized for the efficient training of a SigCat NN (e.g., to train the NN so that it can categorize federal signals). Federal Signal Types 2100 can include, for example, as complete as practicable a variety of actual and notional signals that may be employed by a spectrum sharing incumbent for various federal systems, including radar, communications, and other functions in a shared spectrum band, such as the 3550 MHz US naval radar band. An illustrative list of such signals for NN training comprises one or more Radar (Naval) pulsed signals 2110; one or more Radar (Marines) pulsed signals 2120; one or more Data Link (Air Force) signals 2130; one or more Data Link (Air Ground) signals 2140; and one or more Noise-like signals 2150 offered with a high signal to noise radio (SNR, designated high SNR in FIG. 2). Such signals may be presented to a learning machine such as SigCat NN 2000 in a variety of forms, such as in a form of time domain signals, in a form of frequency domain measurements, in a form of selected time and frequency domain measurements, and/or in any another useful form, such as via measurements of parameters including signal to noise ratio (SNR), average estimated background noise level, peak signal level above noise, etc., as such parameters and measurements may be convenient for implementation efficiency of SigCat NN computerized logic. A SigCat NN learning machine 2000 may be trained, e.g. via backwards propagation to categorize these managed types of signals into the Federal Signals Category 2400. This category is generic because while it identifies a particular signal as being in the category 2400, it does not identify the actual federal device producing the signal. For example, if the neural network is used to categorize radar (naval) pulsed signals 2110, the neural network only classifies the signal as a federal signal 2400, not with any finer granularity such as indicating that it is radar (naval) pulsed signals 2110.

Managed Signal Types 2200 comprise further time domain and frequency domain samples of signals, organized for the efficient training of a SigCat NN. Managed Signal Types 2200 include, for example, as complete as practicable a variety of actual and notional signals that may be employed by a commercial entity that may be sharing spectrum with another usage such as with a federal incumbent user. Managed Signal Types 2200, for example, may comprise signals conforming to the Third Generation Partnership (3GPP) long term evolution (LTE) or the GSM type of cell phone signals, 2210; along with other signals conforming to other standards such as the wireless microwave access standard, WiMAX, updated to a shared spectrum band as illustrated as signal type 2220; along with other signals conforming to other standards such as the WiFi standard updated WiFi++ to a shared spectrum band as illustrated as signal type 2230 in FIG. 2. A SigCat NN learning machine 2000 may be trained, e.g. via backwards propagation, to categorize these managed types of signals into the generic category 2500, the Managed Signals Category.

Other Signal Types 2300 comprise further time domain and frequency domain samples of signals organized for the efficient training of a SigCat NN. Other Signal Types 2300 include, for example, as complete as practicable a variety of actual and notional signals that may occur in a shared spectrum band but that may not conform to either incumbent or managed signal types. Other Signal Types 2300 therefore may comprise one or more signals having statistical characteristics of noise, such as thermal noise, Additive White Gaussian Noise (AWGN), colored noise (noise not having a flat or white spectrum), and other types of noise, the recognition of which may be helpful to the SigCat NN and designated as Noise (kTB) 2310 in FIG. 2. A SigCat NN learning machine 2000 may be trained, e.g. via backwards propagation, to categorize these managed types of signals into the generic category 2600, the Noise Category.

Other Signal Types 2300 also may include one or more signals having statistical characteristics having some characteristics of incumbent and/or managed signals or both having time domain and frequency domain characteristics corrupted to a large degree by noise. Such signals may be termed Clutter since they are neither signals nor noise, having characteristics of both (e.g., because of a low SNR). Replicas of federal incumbent signals 2100 may be corrupted for training purposes by incorporating samples of noise into the training of a SigCat NN 2000 for an Unknown Category 2700. Replicas of managed signals may be corrupted by incorporating samples of noise into the training of such a SigCat NN 2000 for such an Unknown Category 2700. Paths for training such a SigCat NN include paths Low SNR 2801 and Low SNR 2802 of FIG. 2. In this figure, lines among signal types and signal categories are illustrative of associations made by SigCat NN 2000. Because of the often inherent ability of neural networks to integrate and associate inputs with outputs nonlinearly via weights of connections, the lines are exemplary in FIG. 2 but may not include the many nonlinear relationships among inputs and outputs of such a neural network 2000.

Training of such a SigCat NN 2000 may be automated via the use of signal processing tools (e.g., such as Matlab), and/or via the use of scripting languages (e.g., such as Python, Perl, and Ruby). Input to a SigCat NN may include hundreds, thousands, and/or millions of points at which signals may be sampled. Input may be conditioned on states of measurements of unknown input signals, such as a time domain test of a signal level exceeding a threshold value; or of a frequency domain test of a peak value of a power spectrum density exceeding a threshold set to achieve high probability of correct signal categorization; and/or the like.

Figure 3A:
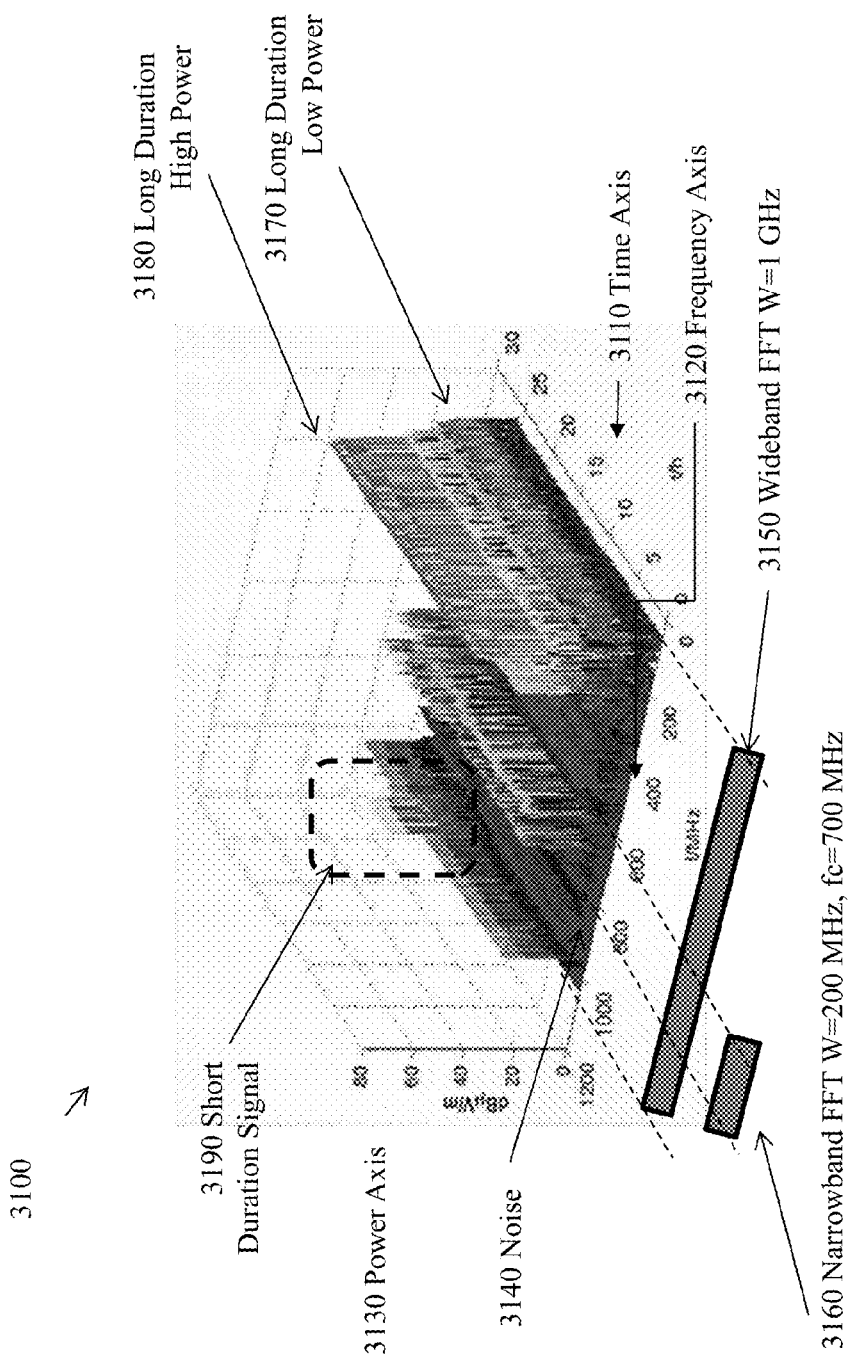
FIG. 3A illustrates signals features of signals that can be used to train a device for obfuscating radio signals, according to some embodiments.

FIG. 3A illustrates features of signals that can be used to train a device for obfuscating radio signals, according to some embodiments. The features can be computed via fast Fourier Transforms (FFT), power spectrum density (PSD), Wigner-Ville distributions, Wavelet distributions, and/or other methods of characterizing signals, illustrated as signals features 3100 (e.g. FFT, pulses). For example, FFTs, sampling rates, and their parameters can be used to describe signal strength over frequency and time. Signals features may be computed in conjunction with training a SigCat NN 2000. In some embodiments, signals features may be presented to SigCat NN as inputs. In some embodiments, training may compute signals features from which to derive simple parameters for inclusion into NN training inputs (e.g., either alone or in conjunction with the signals features on which they are based). For example, a PSD may be computed, for example, from an input set of 2048 points of a signal as a signals feature. Such a PSD having 2048 points as input may generate 1024 non-redundant power spectrum density points as output. A peak value P within the 1024 resulting PSD values and/or the location of a peak value in the frequency domain (e.g., such as the PSD point number j, and/or frequency value fj), may be computed from a PSD. A pair of parameters (P, j) may be employed to train SigCat NN 2000 in lieu of a PSD and/or in conjunction with one or more other values of a PSD.

Signals features 3100 of FIG. 3A may be referred to in a time-frequency space having a Time Axis 3110 and a Frequency Axis 3120, with, for example, a Power Axis 3130 representing signal intensity, such as the intensity values of a PSD. Signals having the statistical structure of Noise 3140 may be computed by comparing one or more time and/or frequency domain average values to each other.

A wideband FFT may be computed by, for example, sampling a time-domain signal at a sampling rate (fs) of 2 GHz resulting in Wideband FFT 3150 with W=1 GHz, having an instantaneous Nyquist bandwidth, W, of fs/2, which would be 2 GHz/2=1 GHz, which is 1000 MHz as illustrated in FIG. 3A. Such a wideband FFT may result in the computation of wideband features of a large band of radio spectrum. Parameters derived from Wideband FFT 3150 may include an estimate of the number of distinct signals present in such a band.

A Narrowband FFT 3160 may, for example, be derived from Wideband FFT 3150 to have a net effective bandwidth W equal to 200 MHz, with sampling organized such that the PSD falls between 600 and 800 MHz for a center frequency, fc equal to 700 MHz, briefly W=200 MHz; fc=700 MHz. Such a narrowband FFT may result in the computation of narrowband features of a smaller band of radio spectrum. Parameters derived from Narrowband FFT 3160 may include an estimate of the bandwidth of a given signal present in such a narrower band of radio spectrum.

A signal having long duration in time and having relatively low power may be evident in time-frequency space 3100 as illustrated by Long Duration Low Power signal 3170. Such a signal may have features and signal parameters computed via narrowband FFT, time domain functions, cyclostationary features, etc. A distant or low power communications signal such as an LTE GAA device may exhibit such time-frequency signal features that may be learned by a SigCat NN.

A signal having long duration in time and having relatively high power may be evident in time-frequency space 3100 as illustrated with signal 3180, Long Duration High Power. Such a signal may have features and signal parameters computed via narrowband FFT, time domain functions, cyclostationary features, etc. A communications signal that is spatially proximate or that operates at high power such as GSM or LTE base station or proximate small cell may exhibit such time-frequency signal features that may be learned by a SigCat NN.

A signal having short duration in time and having relatively high power compared to other signals may be evident in time-frequency space 3100 as observed in Short Duration Signal 3190. Such a signal may have features and signal parameters computed via narrowband FFT, time domain functions, cyclostationary features, etc. A proximate or high power radar signal such as US navy radar may exhibit such time-frequency signal features that may be learned by a SigCat NN.

The computation of such features during training and subsequently during testing may facilitate categorization of signals by SigCat NN 2000.

FIG. 3B illustrates communications signals parameters at the top level that can be used to train a device for obfuscating radio signals, according to some embodiments. The parameters illustrated in FIG. 3B may be established by standards bodies such as the IEEE, ETSI, 3GPP, etc. Such parameters may be computed from lower level signal features and parameters shown in FIG. 3A to assist in training a SigCat NN 2000.

FIG. 3B illustrates parameters for GSM, UTRA-FDD and LTE. The channel spacing 3202 is 200 kHz for GSM, 5 MHz for UTRA-FDD and 10 MHz for LTE. The access mode 3204 is FDMA/TDMA for GSM, Direct Sequence (DS), CDMA for UTRA-FDD and OFDM for LTE. The duplex mode 3206 is FDD/TDD for GSM, FDD for UTRA-FDD and TDD FDD for LTE. The users per carrier frequency 3208 is 8 for GSM, depends on the situation for UTRA-FDD and multiple for LTE. The net data rate 3210 is 13 kbit/s for GSM, 8 kbit/s to 2 Mbit/s for UTRA-FDD and 2-50 Mbps for LTE. The modulation mode 3212 is GMSK for GSM, QPSK for UTRA-FDD and N-QAM for LTE. The channel coding 3214 is CRC, convolutional for GSM, convolutional, turbo, CRC with interleaving for UTRA-FDD and multiple for LTE. The symbol duration 3216 is 3.692 usec for GSM, depends on the spreading factor for UTRA-FDD and 83 or 74 usec for LTE. The bits per burst (slot) 3218 is 156.25 for GSM, depends on the spreading factor for UTRA-FDD and 6 or 7*N for LTE. The burst (slot) duration 3220 is 0.577 ms for GSM, 0.677 ms for UTRA-FDD and 0.5 ms for LTE. The frame duration 3222 is 4.62 ms for GSM, 10 ms for UTRA-FDD and 10 ms for LTE. The channel bit rate 3224 is 270.833 kbit/s for GSM, depends on the situation for UTRA-FDD and multiple for LTE. The maximum cell radius 3226 is 35 km for GSM, few kilometers for UTRA-FDD and 0.7-80 km for LTE. The user specific signatures 3228 for UTRA-FDD are OVFS codes. The spreading factor is 1 for GSM and $2^k$, where k=2, 3, . . . , 8; 512 downlink only for UTRA-FDD. The chip rate 3232 for UTRA-FDD is 3.84 Mchip/s.

Figure 4A:
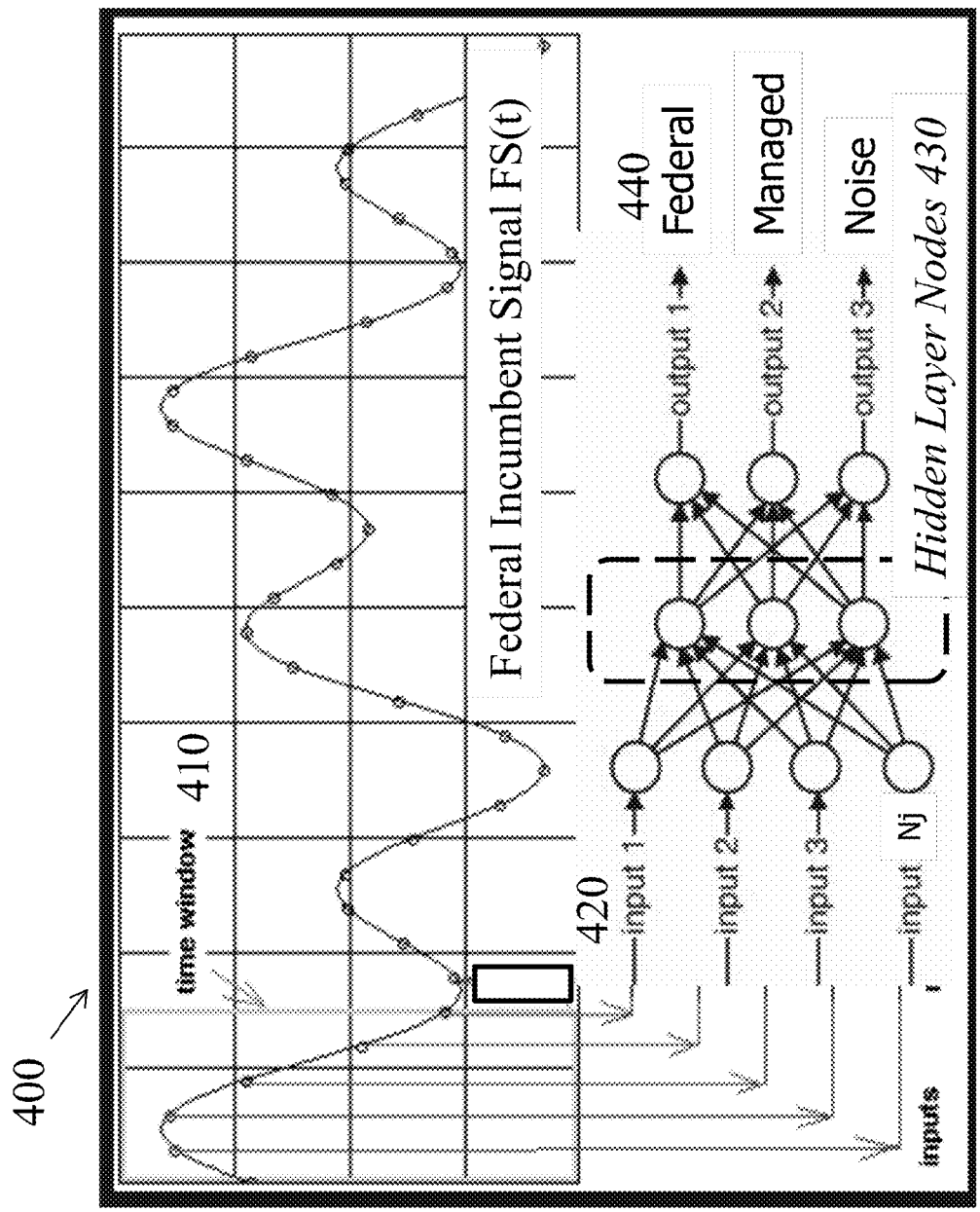
FIG. 4A illustrates an artificial neural network learning machine for obfuscating radio signals, according to some embodiments.

FIG. 4A illustrates an artificial neural network learning machine 400 for obfuscating radio signals, according to some embodiments. The machine 400 may receive inputs such as a signal 410 sampled in the time domain, referred to as a Federal Incumbent Signal FS(t); and/or in any other convenient signals features domain. The inputs may include results of FFT, PSD, cyclostationary, wavelet, and other computations, such as those yielding signal parameters as illustrated in FIGS. 3A and 3B. The inputs may be provided to an input layer 420 of a SigCat NN 2000. The input layer 420 includes inputs 1, 2, 3 through input Nj. The neural network includes one or more hidden layers of nodes 430. The neural network includes an output layer 440, which in this illustrative example includes output 1 for classification in the federal category, output 2 for classification in the managed category, and output 3 for classification in the noise category.

Figure 4B:
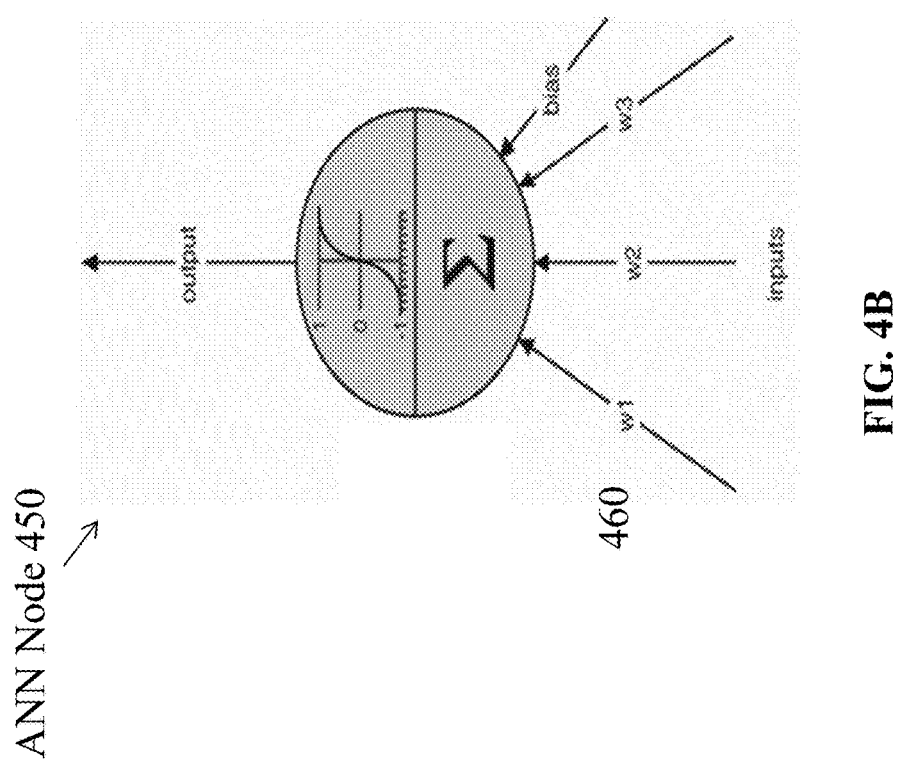
FIG. 4B illustrates a node of an artificial neural network learning machine for obfuscating radio signals, according to some embodiments.

FIG. 4B illustrates a node of an artificial neural network learning machine for obfuscating radio signals, according to some embodiments. Each node within a neural network, such as that shown in FIG. 4A, may comprise an ANN Node 450 having weights 460. While weights w1, w2, w3 and bias are shown for illustrative purposes, each node can receive any number of weights w1 through wNj. The weights 460 are learned from input 1, input 2, etc. that may comprise functions of time, e.g. f(t), PSD values, or parameter values, e.g. from FIG. 3B for input layers resulting in weights w1, w2, w3, etc., of input, hidden, and output layers. A bias term of FIG. 4B may be included to facilitate learning. The layers and weights may integrate spectrum artifacts that occur below a given noise floor but that may be integrated above the noise floor, e.g. by the combination of weights learned during such a training sequence; a sequence of such signals may embody, for example, a HMM. Such training sequences may enable such a neural network to incorporate signal artifacts in the recognition of signals, such as presenting the NN with a replica having a signal artifact such as an out of band harmonic, enabling the NN to recognize and categorize such a signal reliably.

Figure 5:
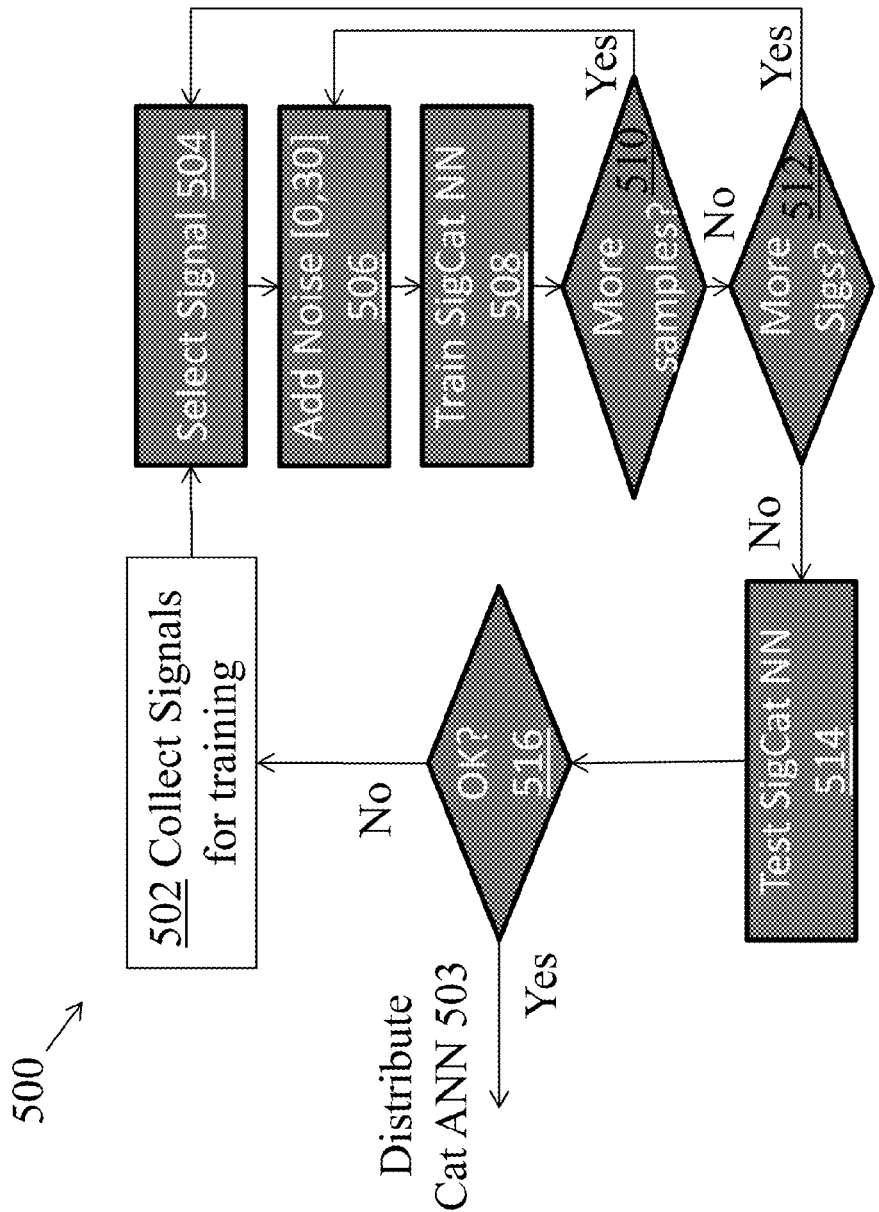
FIG. 5 illustrates an exemplary computerized signal categorization method for obfuscating radio signals, according to some embodiments.

FIG. 5 illustrates an exemplary computerized signal categorization method 500 for obfuscating radio signals, according to some embodiments. At step 502, the method 500 may collect example signals that correspond to categories for which to train the neural network. For example, signals can be collected that can be used to train the neural network to recognize signals in the following categories: (Federal) Incumbent, Managed, Noise, and Clutter. At step 504, the collected signals may be selected for addition of noise at step 506 to train a SigCat NN at step 508. At step 510, a determination may be made to present additional examples of a selected signal to train a SigCat NN, e.g. having different amplitude values, noise levels, etc. The decision made at step 510 may result in the generation of additional signals for training by returning to step 506. Upon completion of training a SigCat NN with samples of a given signal at step 508, at step 512 the method determines whether there are more signals upon which to train the SigCat NN, and the method proceeds back to step 504. Thus, the method may continue to return to step 506 from step 510 until sufficient signals of different noise levels have been trained. The method may continue to return to step 504 from step 512 until a sufficient number of representative signals (e.g., incumbent, managed, noise signals) are trained.

At step 514, one or more tests may be performed to determine whether SigCat NN provides sufficiently accurate signal categorization into the desired categories. For example, tests can be performed to determine whether a SigCat NN trained to recognize Incumbent, Managed, Noise, and Clutter categories sufficiently categorizes test signals. At step 516 the method determines whether the neural network passes the tests applied at step 514. Upon success, path 503 results in the distribution of SigCat NN to external devices, such as illustrated above in FIG. 1, path 1150. If the tests are not successful, the method can return to step 502 to select additional signals for training.

Figure 6:
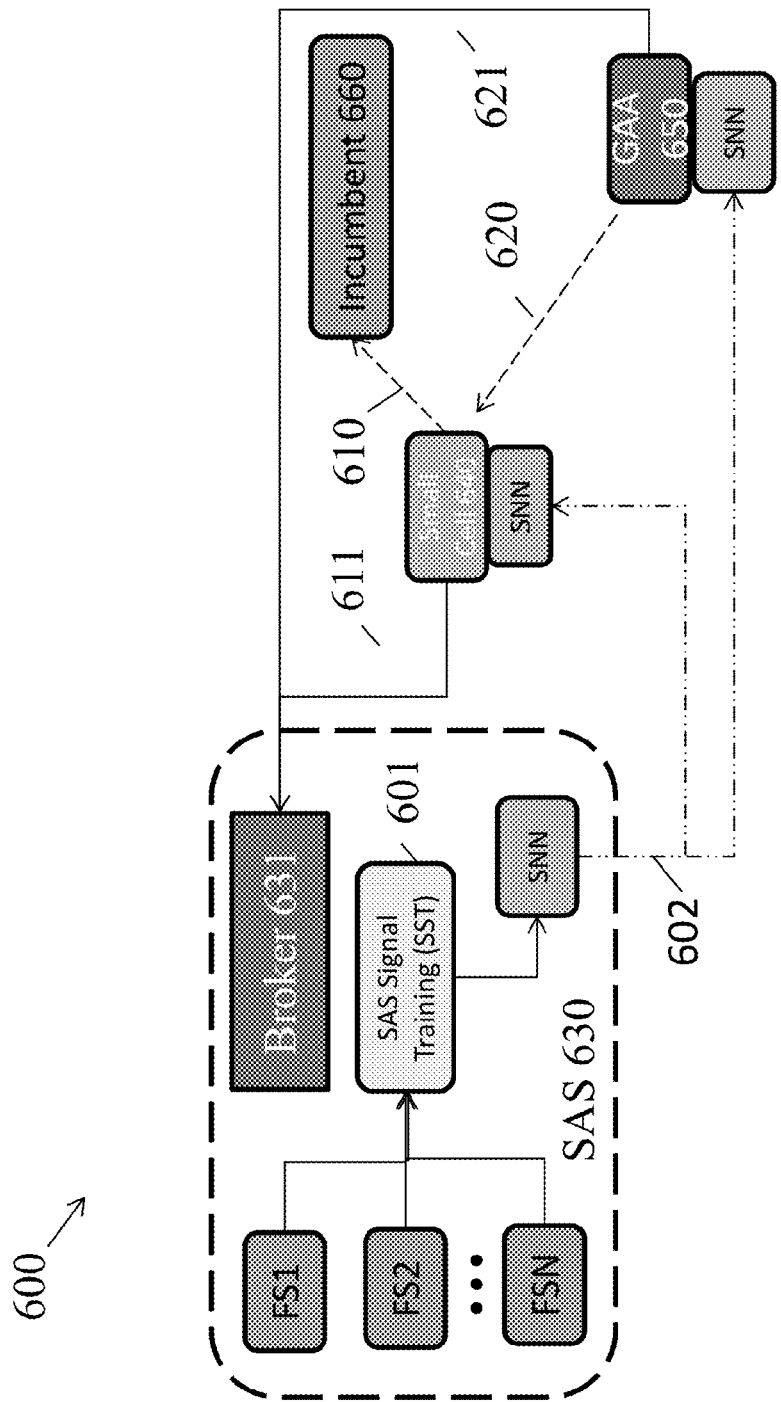
FIG. 6 illustrates an exemplary implementation of obfuscating radio signals, according to some embodiments.

FIG. 6 illustrates an exemplary implementation 600 of obfuscating radio signals, according to some embodiments. FS1, FS2 through FSN represent sensitive federal signal (FS) types. At 601 a SAS 630 trains the SigCat NN (SNN) to create SigCat NN ready for distribution designated SNNs, such as using the technique explained with reference to FIG. 5. At 602 the SAS distributes the SNN to GAA 650 and Small Cell 640 Devices. At 610 the small cell channel state indicates (CSI) may be provided to the associated SNN to indicate Incumbent Category. At 611 the small cell 640 reports the Incumbent category with the associated CSI to the Broker 631; a SAS 630 may determine that the Incumbent category has been indicated by SNN because of the presence of FS2 in the CSI. In such a case, the SAS may control such a small cell 640 via control path 602 to minimize interference to FS2, such as clearing the channel by prohibiting the small cell 640 from transmitting, reducing its power level, etc. At 620 the GAA 650 observes CSI that may be provided to its associated SNN to determine a Managed category, such as LTE in use. A spectrum Broker 631 of SAS 630 then may be advised by GAA 650 via path 621 of such an observation of LTE. The broker 630 may associate the Managed signal category with LTE of a given small cell 640 such as the small cell 640 of the figure. At 621 the GAA 650 reports Managed Spectrum CSI as determined via its associated SNN; SAS 630 Broker 631 may in turn shut down such a GAA device 650, mitigating harmful interference to the small cell 640 that may have priority over GAA 650.

Because of the infeasibility of reverse engineering the weights of a SigCat NN (or any other NN or other type of such machine learning structure) to determine the signal structures by which it was trained, the SigCat obfuscates the federal signals used to train the neural network. A SigCat NN thus may categorize a signal as noise or federal incumbent, but lacking a signal type classification intermediate step, the details of the military signal such as radar or military communications are obfuscated. In some embodiments, integration of information, inference of the associated HMMs, and/or training a SigCat NN can be performed by the federal government and/or by an authorized SAS to further enable a commercial RSAS to efficiently protect federal incumbents from interference without undesirably revealing signal type to a third party.

A service provider may benefit from knowledge of interference sources that occur in a given band to plan and/or manage nearby frequency bands. For example, a service provider can use knowledge of interference sources in the 3300 MHz radar band in order to better plan shared spectrum networks such as the 3550 Citizens Broadband Service (CBS) shared spectrum band for which the FCC has issued multiple Notices of Rule Making (NPRM). For example, transmissions in the 3300 MHz radar band may interfere with the 3550 CBS shared spectrum band, which would be desirable to know when planning a shared spectrum network for the 3550 CBS shared spectrum band.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method of categorizing signals sensed from receivers into one of a plurality of categories using a machine learning component that obfuscates other characteristics of the signals beyond the categorization of the signal, comprising:
generating, by a computing device, a set of training signals comprising signals representative of each of a plurality of categories of signals, the plurality of categories including categories for incumbent signal types, managed signal types, noise signal types, and clutter signal types;
training, by the computing device, a machine learning component using the set of training signals so that the machine learning technique can categorize new signals into one of the plurality of categories; and
transmitting, by the computing device, the machine learning component to one or more receivers so that each receiver can categorize sensed signals into one of the plurality of categories using the machine learning component while obfuscating other characteristics of the sensed signals.

2. The computerized method of claim 1 further comprising:
receiving data from a receiver of the one or more receivers indicative of a device interfering with an incumbent device; and
transmitting a notification to the device to terminate transmissions to prevent the device from interfering with the incumbent device.

3. The computerized method of claim 1 wherein:
generating the set of training signals comprises determining a set of spectrum artifacts that occur below a given noise floor but that may be integrated above the noise floor; and
the machine learning component comprises training the machine learning component using the set of spectrum artifacts so that the machine learning component can detect and categorize interference between signals from a plurality of devices.

4. The computerized method of claim 1 further comprising:
detecting interference in a given band of spectrum;
detecting signal artifacts in adjacent or distant bands of the spectrum; and
correlating the detected interference with the detected signal artifacts to determine whether a signal categorization is reliable.

5. The computerized method of claim 1, wherein training the machine learning component comprises training a set of signal structures with respect to time and frequency occupancy to generate a hidden Markov model to integrate a diversity of signal artifacts occurring in one or more bands in the machine learning component.

6. The computerized method of claim 5, wherein the one or more bands comprises a managed band, a band that is distant in center frequency from a band of operation, a band that is distant in center frequency from a band of interest for future usage, or any combination thereof.

7. The computerized method of claim 1, further comprising:
receiving data indicative of incumbent interference in a frequency band; and
determining a degree of interference in a band of interest based on the incumbent interference.

8. A computing device for categorizing signals sensed from receivers into one of a plurality of categories using a machine learning component that obfuscates other characteristics of the signals beyond the categorization of the signal, comprising:
a database; and
a processor in communication with the database, and configured to run a module stored in memory that is configured to cause the processor to:
generate a set of training signals comprising signals representative of each of a plurality of categories of signals, the plurality of categories including categories for incumbent signal types, managed signal types, noise signal types, and clutter signal types;
train a machine learning component using the set of training signals so that the machine learning technique can categorize new signals into one of the plurality of categories; and
transmit the machine learning component to one or more receivers so that each receiver can categorize sensed signals into one of the plurality of categories using the machine learning component while obfuscating other characteristics of the sensed signals.

9. The computing device of claim 8, wherein the module stored in memory is configured to cause the processor to:
receive data from a receiver of the one or more receivers indicative of a device interfering with an incumbent device; and
transmit a notification to the device to terminate transmissions to prevent the device from interfering with the incumbent device.

10. The computing device of claim 8, wherein the module stored in memory is configured to cause the processor to:
generate the set of training signals comprising determining a set of spectrum artifacts that occur below a given noise floor but that may be integrated above the noise floor; and
train the machine learning component comprising training the machine learning component using the set of spectrum artifacts so that the machine learning component can detect and categorize interference between signals from a plurality of devices.

11. The computing device of claim 8, wherein the module stored in memory is configured to cause the processor to:
detect interference in a given band of spectrum;
detect signal artifacts in adjacent or distant bands of the spectrum; and
correlate the detected interference with the detected signal artifacts to determine whether a signal categorization is reliable.

12. The computing device of claim 8, wherein training the machine learning component comprises training a set of signal structures with respect to time and frequency occupancy to generate a hidden Markov model to integrate a diversity of signal artifacts occurring in one or more bands in the machine learning component.

13. The computing device of claim 12, wherein the one or more bands comprises a managed band, a band that is distant in center frequency from a band of operation, a band that is distant in center frequency from a band of interest for future usage or any combination thereof.

14. The computing device of claim 8, wherein the module stored in memory is configured to cause the processor to:
receive data indicative of incumbent interference in a frequency band; and
determine a degree of interference in band of interest based on the incumbent interference.

15. A non-transitory computer readable medium having executable instructions operable to cause an apparatus to:
generate a set of training signals comprising signals representative of each of a plurality of categories of signals, the plurality of categories including categories for incumbent signal types, managed signal types, noise signal types, and clutter signal types;
train a machine learning component using the set of training signals so that the machine learning technique can categorize new signals into one of the plurality of categories; and
transmit the machine learning component to one or more receivers so that each receiver can categorize sensed signals into one of the plurality of categories using the machine learning component while obfuscating other characteristics of the sensed signals.

16. The non-transitory computer readable medium of claim 15, having executable instructions operable to cause an apparatus to:
receive data from a receiver of the one or more receivers indicative of a device interfering with an incumbent device; and
transmit a notification to the device to terminate transmission to prevent the device from interfering with the incumbent device.

17. The non-transitory computer readable medium of claim 15, having executable instructions operable to cause an apparatus to:
generate the set of training signals comprising determining a set of spectrum artifacts that occur below a given noise floor but that may be integrated above the noise floor; and
train the machine learning component comprising training the machine learning component using the set of spectrum artifacts so that the machine learning component can detect and categorize interference between signals from a plurality of devices.

18. The non-transitory computer readable medium of claim 15, having executable instructions operable to cause an apparatus to:
detect interference in a given band of spectrum;
detect signal artifacts in adjacent of distant bands of the spectrum; and
correlate the detected interference with the detected signal artifacts to determine whether a signal categorization is reliable.

19. The non-transitory computer readable medium of claim 15, wherein training the machine learning component comprises training a set of signal structures with respect to time and frequency occupancy generate a hidden Markov model to integrate a diversity of signal artifacts occurring in one or more bands in the machine learning component.

20. The non-transitory computer readable medium of claim 15, having executable instructions operable to cause an apparatus to:
   receive data indicative of incumbent interference in a frequency band; and
   determine a degree of interference in a band of interest based on the incumbent interferences.

* * * * *